Sept. 15, 1931.    T. C. CAMPBELL    1,823,085

SHOW CASE

Filed Sept. 6, 1929

INVENTOR
T. C. CAMPBELL
BY J. MacDonald
ATTORNEY

Patented Sept. 15, 1931

1,823,085

UNITED STATES PATENT OFFICE

THADDEUS C. CAMPBELL, OF RUTHERFORD, NEW JERSEY, ASSIGNOR TO BELL TELEPHONE LABORATORIES, INCORPORATED, OF NEW YORK, N. Y., A CORPORATION OF NEW YORK

SHOW CASE

Application filed September 6, 1929. Serial No. 390,675.

This invention relates to show cases and more particularly to doors used in such cases.

The object of this invention is to provide a device for securing a glass plate in its framework in a simple, convenient and positive manner.

According to this invention, a strip of fibrous material is placed along the edge of the glass plate and a yieldable U-shaped strip is placed between a centrally disposed fin of the frame work and the glass, this yieldable strip being caused to spread by the tightening of a number of screws for exerting an edgewise pressure on the glass plate and to compensate for the inequality in the dimensions of the glass and the frame. The clamping strip is then secured in position on the U-shaped strip in a manner to exert pressure against the face of the glass plate for holding it flatwise against the framework upon the tightening of a number of screws which engage the U-shaped strip, the strip of fibrous material serving to distribute the pressure of the strips on the glass and to serve as a cushion therebetween.

Figure 1:
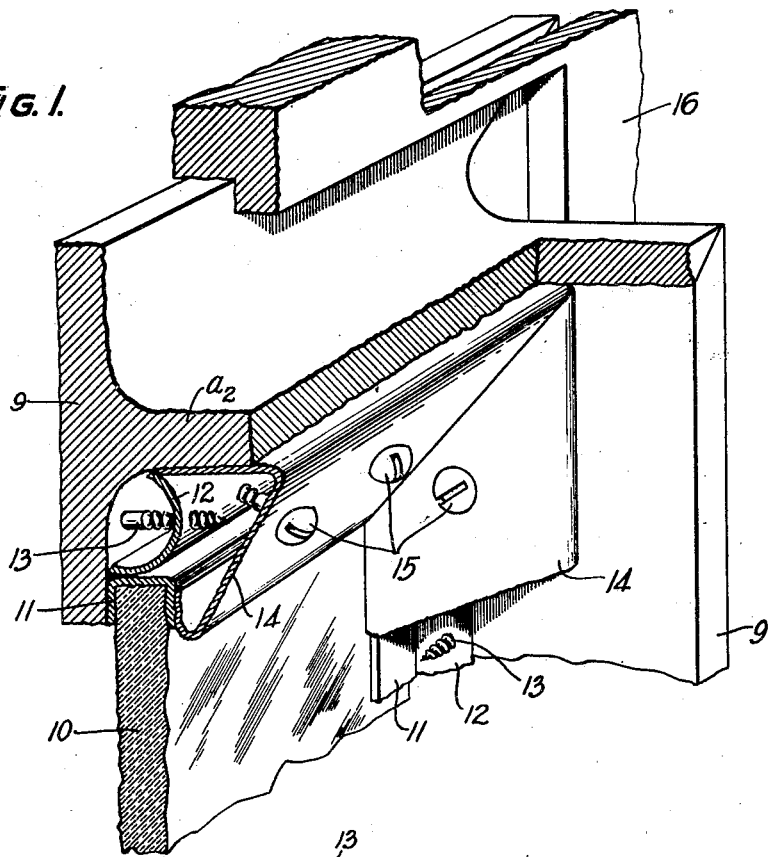
Figure 2:
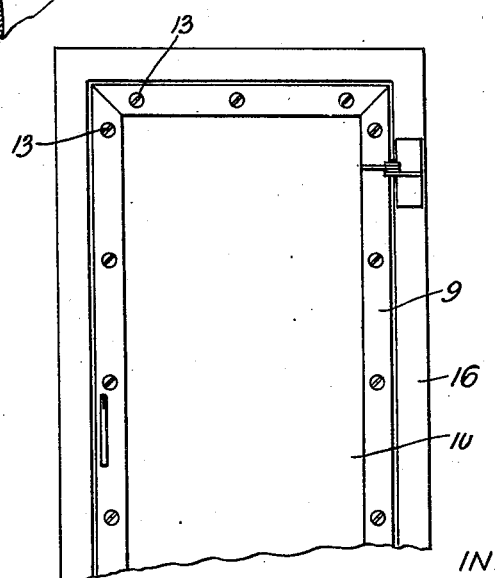

In the drawings, Fig. 1 is a perspective view of a framework embodying the glass plate securing device of this invention shown with portions of the frame, glass and securing strips cut away, and Fig. 2 is a front view of a framework with the glass in position thereon.

As shown in the drawings, a rectangular framework is formed by the assembly of a number of T-shaped bars 9 which may be united at their intersecting points as by welding or any other suitable manner. Around the peripheral edges of glass plate 10 is placed a preformed strip 11 of felt or any other cushioning material. The glass plate 10 is then placed in position in the framework as shown in Fig. 1. In the space between the fin members $a_2$ of the T-shaped bars and the periphery of glass plate 10 are mounted in an inverted position, the strips 12 of semi-circular cross section. One edge of these strips bears against the fins $a_2$ of the bars and the other edge engages the felt strip 11 at the periphery of the glass plate. Strips 12 are preferably made of resilient material and are caused to spread through the tightening of a number of screws 13 for holding the glass plate securely against sideway movement in the framework.

The strips 14 of triangular cross section have each one side in abutment against the fins $a_2$ of the T-shaped bars and a portion of these bars in abutment against that portion of the cushioning strips which extend over the face of the glass plate with the edge of the strip 14 resting against the strip 12. A number of screws such as 15 which threadedly engage the strip 12 are provided for forcing the strip 14 against the glass plate for holding it flatwise against the framework formed by the bars 9 as above described.

A framework thus constructed may be hinged to any suitable frame 16 shown in Fig. 2, while providing a simple, cheap and convenient fastening device for the glass plate which device is capable of compensating for great dimensional difference between the framework and the glass plate.

What is claimed is:

1. In combination with a framework, a glass plate mounted therein and a combined clearance take-up and clamping device for holding the glass plate in the framework, the clearance take-up element of said device holding the plate against edgewise motion and the other element holding the plate against flatwise motion in the framework, and a fastening device for each of said elements, each of said fastening devices engaging the clearance take-up element.

2. In combination with a framework, a glass plate, a strip of fibrous material mounted around the glass and extending a small distance over the opposite faces thereof, a member arranged to flex under the action of screws for holding the plate against edgewise motion in the frame, and a device for holding the glass plate against flatwise motion in the frame.

3. In combination with a framework, a glass plate, a strip of fibrous material placed around the edge of said plate, an adjustable device disposed between the fibrous material and the framework for taking up inequalities of clearance therebetween, screws for securing said device to the framework, another adjustable device for holding the glass plate flatwise against the framework and fastening screws therefor engaging the first mentioned adjustable device.

In witness whereof I hereunto subscribe by name this 29th day of August, 1929.

THADDEUS C. CAMPBELL.